United States Patent [19]

Olson et al.

[11] Patent Number: 4,536,837

[45] Date of Patent: Aug. 20, 1985

[54] IMPROVED DISK FILE ALLOCATION AND MAPPING SYSTEM UTILIZING CYLINDER CONTROL BLOCKS AND FILE MAP HAVING UNBALANCED TREE STRUCTURE

[75] Inventors: Robert A. Olson, Los Altos; Patrick D. Ross, Sunnyvale, both of Calif.

[73] Assignee: Elxsi, San Jose, Calif.

[21] Appl. No.: 381,991

[22] Filed: May 25, 1982

[51] Int. Cl.³ .......................... G06F 7/00; G06F 13/04
[52] U.S. Cl. ...................................... 364/200; 364/300
[58] Field of Search ................................ 364/200, 900

[56] References Cited

U.S. PATENT DOCUMENTS

| 4,148,098 | 4/1979 | McCreight et al. | 364/200 |
| 4,215,400 | 7/1980 | Denko | 364/200 |
| 4,408,273 | 10/1983 | Plow | 364/200 |

OTHER PUBLICATIONS

Ritchie and Thompson, *The UNIX Time-Sharing System*, The Bell System Technical Journal, vol. 57, No. 6, Part 2.
"The Structure of the DEMOS File System" (Michael Powell, C-11, Los Alamos Scientific Laboratory), pp. 1-13.

*Primary Examiner*—Gareth D. Shaw
*Assistant Examiner*—Daniel K. Dorsey
*Attorney, Agent, or Firm*—Townsend and Townsend

[57] ABSTRACT

A disk file management system for use in a data processing system that includes at least one disk drive. The disk space is organized on the basis of logical cylinders, with each logical cylinder including a plurality of disk pages and a cylinder control block ("CCB"). Each entry in the CCB corresponds to a page in the CCB's cylinder. Depending on whether a page is allocated to a file or not, the corresponding CCB entry is a file map entry for a file to which the page is allocated or an entry in a free space map. For a given file, each file map entry includes up to two pointers so that the totality of page map entries for the file defines an unbalanced binary tree structure that consists of a sequence of balanced binary trees of increasing size. The free space map for a given cylinder is preferably a chained free space list.

11 Claims, 8 Drawing Figures

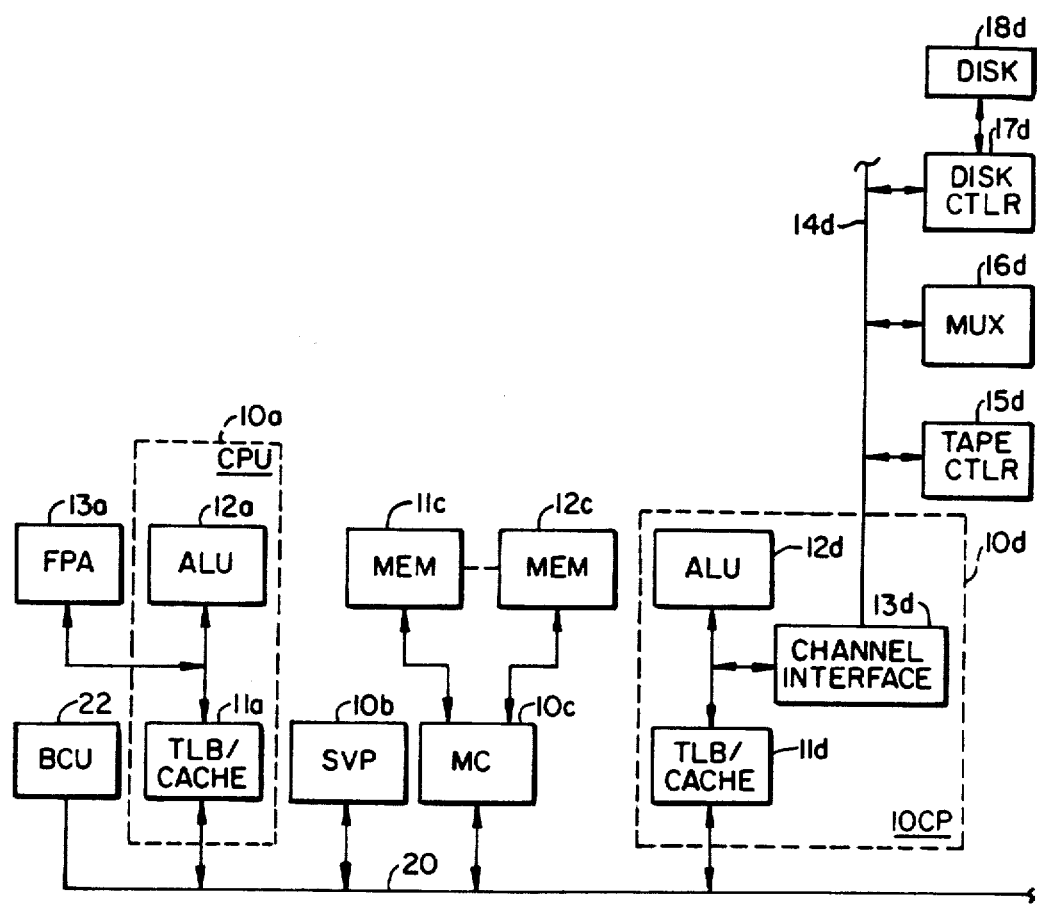
FIG._1.

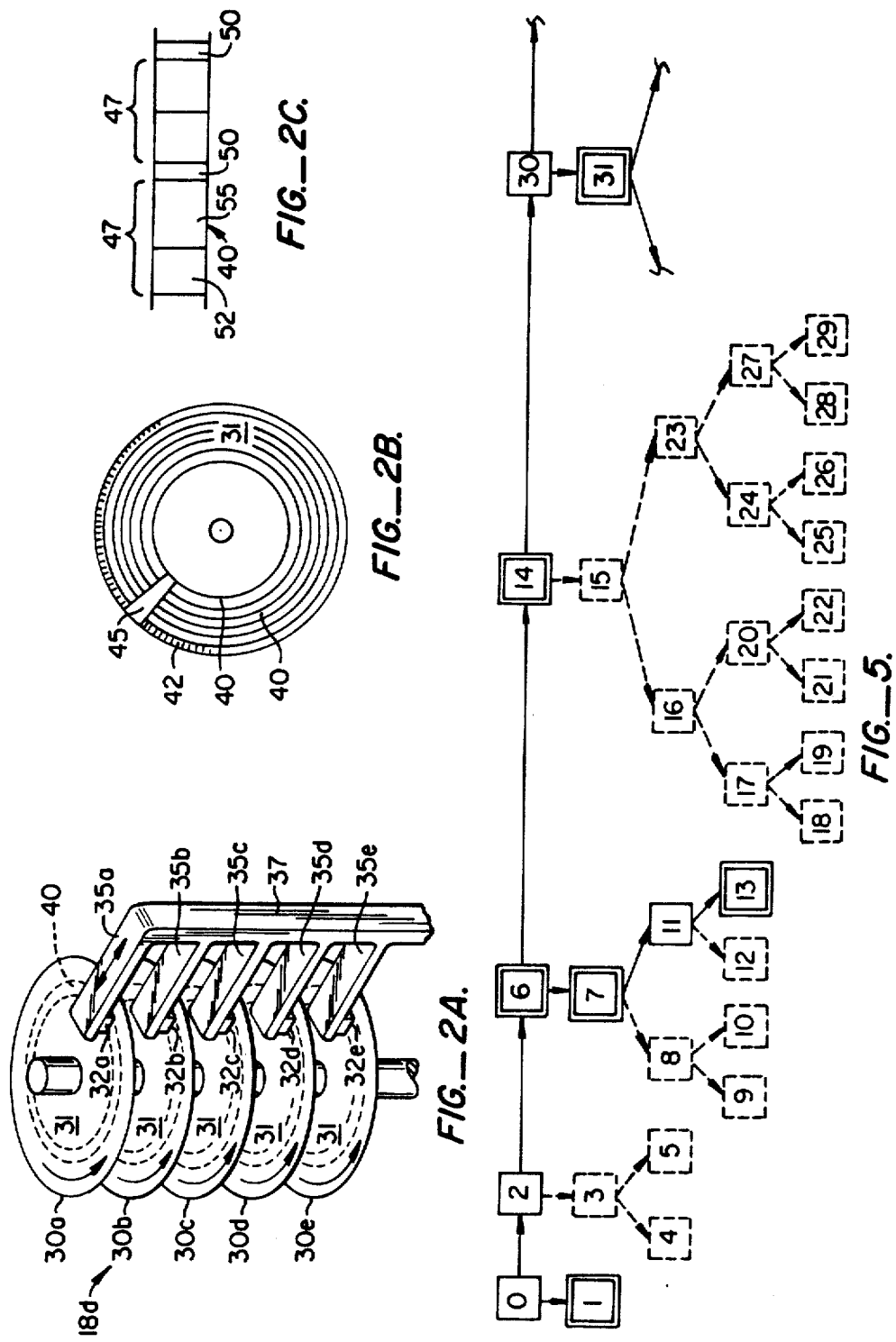

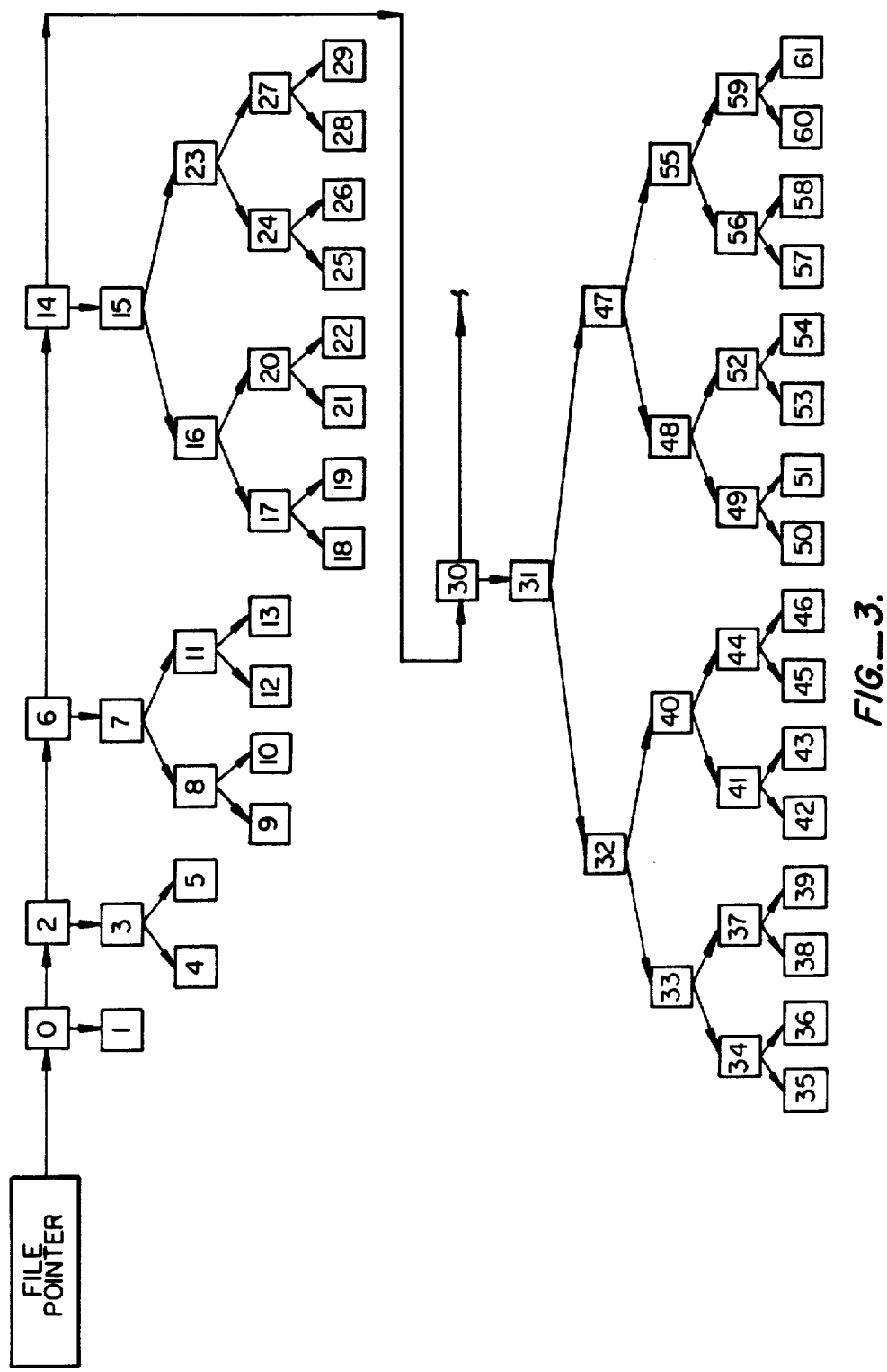
FIG._3.

CCB 1

| FILE POINTER | | | |
|---|---|---|---|
| "1/5" | (5) X | "1/9" | "1/10" |
| | (6) X | "2/200" | "2/201" |
| | (9) X | — | — |
| | (10) X | "1/6" | "2/16" |
| | (250) X | — | — |
| | (251) X | — | — |
| | (255) X | UNALLOC. | UNALLOC. |

CCB 2

| | | |
|---|---|---|
| (1) X | "2/97" | "1/255" |
| (16) X | "2/1" | UNALLOC. |
| (97) X | "1/250" | "1/251" |
| (200) X | — | — |
| (201) X | — | — |

| LOGICAL PAGE NO. | PHYSICAL DISK ADDRESS (CYL/PG) | POINTERS (LOGICAL PAGE NOS.) |
|---|---|---|
| 0 | 1/5 | (1, 2) |
| 1 | 1/9 | — |
| 2 | 1/10 | (3, 6) |
| 3 | 1/6 | (4, 5) |
| 4 | 2/200 | — |
| 5 | 2/201 | — |
| 6 | 2/16 | (7, 14) |
| 7 | 2/1 | (8, 11) |
| 8 | 2/97 | (9, 10) |
| 9 | 1/250 | — |
| 10 | 1/251 | — |
| 11 | 1/255 | (12, 13) |

*FIG._4.*

| | CCB 1 | | | | CCB 2 | | |
|---|---|---|---|---|---|---|---|
| FILE POINTER | | | | | | | |
| "1/5" | (5) | X | "1/9" | "1/10" | (1) | X | UNALLOC. | "1/255" |
| | | | | | (16) | X | "2/1" | "2/251" |
| | (9) | X | — | — | | | | |
| | (10) | X | UNALLOC. | "2/16" | | | | |
| | | | | | (250) | X | — | — |
| | | | | | (251) | X | UNALLOC. | "2/253" |
| | | | | | (252) | X | UNALLOC. | UNALLOC. |
| | (255) | X | UNALLOC. | "2/250" | (253) | X | "2/252" | UNALLOC. |

| LOGICAL PAGE NO. | PHYSICAL DISK ADDRESS (CYL/PG) | POINTERS (LOGICAL PAGE NOS.) |
|---|---|---|
| 1 | 1/9 | — |
| 6 | 2/16 | (7, 14) |
| 7 | 2/1 | (8, 11) |
| 13 | 2/250 | — |
| 14 | 2/251 | (15, 30) |
| 31 | 2/252 | (32, 47) |
| 0 | 1/5 | (1, 2) |
| 2 | 1/10 | (3, 6) |
| 11 | 1/255 | (12, 13) |
| 30 | 2/253 | (31, 62) |

*FIG._6.*

IMPROVED DISK FILE ALLOCATION AND MAPPING SYSTEM UTILIZING CYLINDER CONTROL BLOCKS AND FILE MAP HAVING UNBALANCED TREE STRUCTURE

FIELD OF THE INVENTION

This invention relates generally to the storage of data on secondary computer memories, and more particularly to such storage in systems having multiple data files on rotating random access memories known as disks.

BACKGROUND OF THE INVENTION

Just as a chain can be no stronger than its weakest link, the throughput of a high performance, general purpose computer can be no greater than the throughput afforded by the secondary storage (typically magnetic disk) management subsystem. While magnetic disk drives (hereinafter often referred to simply as "disks") offer the virtues of mass storage and low cost, their operation is characterized by a time scale that is orders of magnitude slower than that of the CPU. Thus, unless the disk access is effectively optimized, the CPU is likely to spend much of its time waiting for more data to process.

Effective optimization of access to a disk requires consideration of the three degrees of freedom of a disk. Broadly, the heirarchy of organizational entities on a disk includes cylinders, tracks, and sectors (or pages). These will now be described.

A disk typically consists of multiple rotating recording surfaces, each with an associated recording head (often referred to simply as a "head"). Each head is connected to an arm which is able to move with great precision to any one of a plurality of radial positions between the edge of the disk surface and a point near the center of the disk. All of the arms of a disk move coincidently; that is, all of the heads are at the same distance from the edge of the disk at the same time. Each head position defines a disk track which is the circular region of disk surface that rotates under the recording head. A track is conventionally broken up into multiple sectors, or pages. The collection of tracks under all of the heads at a given instant in time is known as a cylinder. It is sometimes advantageous to subdivide a cylinder into a small number of logical cylinders, each of which contains up to some predetermined number of pages.

There are various delays associated with accessing any part of the disk other than the sector that is currently under the head. One type of delay is rotational delay, wherein transfer must wait until the right sector has come under the head. This delay is zero if the read/-write circuitry is active and the desired sector is the next one on the current track. Thus there is a certain premium on adjacency of pages to be accessed. Another type of delay is head switching in the current cylinder. On most disks, only one head can be active at a time. Thus, if the desired sector is in the current cylinder but is on a different track, the currently active head must be deactivated and the other activated. By careful positioning of data, the effects of this delay can be minimized but not completely eliminated. The most expensive operation is physically moving the head to another cylinder. The cost of this is roughly proportional to the distance moved, so there are again advantages to adjacency. Therefore, the disk management subsystem can achieve significant performance gains if arm movement and head switching can be minimized.

In modern operating systems it is the responsibility of the operating system to manage the mapping of files onto the underlying disk memories. This involves keeping tables which relate each file to the pieces of disk storage which make up the file and tables which keep track of the pieces of the disk storage which are currently not in use. These structures must allow for dynamic expansion of files and for the efficient allocation of free space. Managing these tables inevitably introduces overhead in the use of the files. A hidden cost is the cost of writing those tables back to disk each time they are modified. Hence, it would be an advantage to minimize the access time to the tables as well as to the data.

One common technique for managing the pieces of a file is to chain the pieces together. That is, each piece contains the address of the next piece (and sometimes the previous piece). This has the advantage that when scanning through files sequentially, the address of the next piece is already in memory, so there is no overhead in looking up the address of the next piece. The major disadvantage of the chained technique is that when accessing data randomly, the system must fetch all pieces between the current location in the file and the new one, even though the intermediate data will not be used.

Another common technique is to have a file map that collects into one place a list of all of the pieces of the file. The file map technique allows direct lookup of the address of the desired piece without requiring a scan of the data of the file. When accessing a file randomly, the map may be in memory after the first reference, reducing the average cost of random access. The only additional cost for sequential access is the memory cost of having the entire map in memory instead of just the address of the next piece.

The main problem with file maps is that they tend to be wasteful of space or quite complicated in internal structure. This is due to the fact that the majority of files are quite small, but the most heavily used files tend to be large. If the file map is small, complicated indirection schemes must be used to support large files. This tends toward the problems of chained approaches. If the file map is large, much space will be wasted on the majority of files which require only one or two pieces of storage.

The UNIX time-sharing system represents a compromise approach wherein direct access structures are used for small files and indirection is used for relatively large files. To this end, the file map includes thirteen pointers: the first ten are direct; the eleventh is indirect; the twelfth is doubly indirect; the thirteenth is triply indirect. This approach, while an improvement, is still limited in that files are restricted to relatively small sizes and the growth increment is not very smooth. (See "The UNIX Time-Sharing System", Ritchie and Thompson, *The Bell System Technical Journal*, Vol. 57, No. 6, part 2).

Disk space which is available for allocation to files is conventionally managed in a variety of ways. The most common is a bit map, with one bit per allocatable piece of storage. Another common technique is chained blocks or "extents". Whenever space is allocated it is removed from the free space table, and whenever it is deallocated it is added to the free space table. Free space tables are typically allocated as fixed sized, contiguous tables in a reserved part of the disk.

The techniques above are described in more detail in Madnick & Donovan, *Operating Systems,* 1974.

A major problem with the usual techniques is that the structures used to manage files on disks are typically physically distant from the space managed. This results in much undesirable arm movement during allocation, deallocation, and file access. For example, in extending a file it is necessary first to detect that extension is required, then to locate a candidate piece physically close to the current end of the file, to update the free space table, to update the file map, to initialize the allocated space on disk, and finally to allow the user to access the newly allocated space. These operations must occur in a strictly choreographed way to protect the data structures from corruption in the event of operating system or hardware failure.

An invention used in the implementation of the DEMOS file system (Powell, "The Structure of the DEMOS File System", design specification) was the cylinder block. On DEMOS, the cylinder block contains file descriptions, including a file map, and a free space map for the cylinder. This approach is advantageous in that the free space map and file map can be updated simultaneously when the space to be allocated was on the same cylinder as the file descriptor. The DEMOS file system was designed for the Cray-1 at Los Alamos National Laboratory, and the base design is clearly tuned for an environment that is characterized by an unusually large number of very large files (data from nuclear weapons experiments, largely). In addition, those files tend to be created once and never extended. Thus, the DEMOS system optimized allocation of files in large chunks.

The DEMOS cylinder block contains an allocation bit map and and array of 30 file descriptors as its major components. The allocation map is simply a bit map of the free pages on that particular cylinder. A file descriptor contains some control information about the given file and eight block group entries. A block group consists of some number of contiguous blocks (sectors) on the disk, determined at the time the block is allocated. Indirect block groups are possible, at some cost. There are 180 blocks (sectors) in each cylinder. It is not possible to have more files than there are file descriptors. Thus for the disk space to be fully utilized the average file size must be at least 6 blocks, or some 24,500 bytes. This is, of course, consistent with the concept of optimizing the system for allocating files in large chunks.

However, the environment for which the DEMOS system was designed varies radically from the typical case in commercial applications. Most existing systems have a very large number of small files which, once created, rarely grow. The large files in those systems tend to be data bases which grow over time by small increments. Moreover, for commercial systems the average file size is something more like 2000-3000 bytes. Thus in a typical commercial application the DEMOS file system would only be able to use 10-20 percent of the available disk space. Similarly, the manner in which indirect blocks are used in the DEMOS system penalizes files which grow in small increments. Thus, while the DEMOS design has significant advantages in its context, it is clearly unsuitable for use in the more common commercial systems.

SUMMARY OF THE INVENTION

The present invention provides a disk file management system that is characterized by minimum head switching and arm movement during allocation, deallocation, and file access. The system is characterized by minimum overhead, and the data structures are highly resistant to hardware and software failures. The system retains the benefits of the DEMOS approach wherein control tables reside on the cylinder where the data resides, but provides data structures that are suitable for a wider range of applications.

According to one aspect of the present invention, the data structures are organized on a logical cylinder basis with the file map and the free space map being embedded in the cylinder control block ("CCB"). More particularly, the file allocation map is separated from the file descriptor and threaded through the CCBs, and the free space map is similarly threaded.

Each logical cylinder is divided up into a number (say 256) of equally sized pages, one of which contains the CCB. The CCB has entries corresponding to the pages in the logical cylinder, which entries contain pointers to other pieces of file space. A particular field within the CCB entry denotes whether or not the page is allocated to a file.

The free space within a logical cylinder is managed by appropriately marking the allocation field in the CCB entry for each unallocated page. When disk pages are allocated to a file, the CCB is updated in memory by changing the CCB entry for the formerly free pages into file allocation map pointers. The disk controller is then instructed to initialize the newly allocated disk pages and to write the new CCB, in that order. Since CCBs exist in the same physical cylinder as the pages which were allocated, there is no arm movement required between initializing the pages and writing the control information. Also, since one command is given to the disk controller to perform both writes, there is a guaranteed order to the writes which protects the data structures in the event of a failure. This also reduces the number of messages exchanged between the operating system and the disk controller, resulting in additional gains in system throughput and data structure reliability.

Another aspect of the present invention provides an improved file map structure based on an unbalanced tree structure. This is preferably an unbalanced binary tree which consists of a sequence of balanced binary trees of increasing size. The CCB entry corresponding to a page which is allocated to a file (that is, a file map entry or a "node") contains up to two pointers to additional nodes.

The structure grows very gracefully, and can grow to a size constrained only by the maximum dimensions of a disk domain ($2^{39} - 1$ bytes in the illustrative embodiment). At the same time, file growth does not affect the file map for the existing portion of the file. The sequence of nodes that must be accessed to reach a given desired page in the file is thus independent of the total number of nodes in the file map. Moreover, a page need only be allocated when it is actually to be used or when its node is needed to complete a path between the root node and some other allocated page.

The binary tree approach results in very fast searches for particular pages (about ($2 \log_2 n$) tries). The use of trees of increasing size optimizes searches for the very common short files without excessively penalizing the less common but still heavily used large files.

For a further understanding of the nature and advantages of the present invention, reference should be made to the remaining portions of the specification and attached drawings.

BRIEF DESCRIPTION OF THE DRAWINGS

FIG. 1 is a block diagram of a computer system which may utilize the disk file management system of the present invention;

FIG. 2A is an isometric schematic view of a multisurface disk drive;

FIG. 2B is a schematic plan view of one of the recording surfaces;

FIG. 2C is a schematic plan view of a portion of a track;

FIG. 3 is a schematic view showing the unbalanced binary tree structure of a file map;

FIG. 4 shows the cylinder control block entries that make up a portion of a file map where all the file pages have been allocated;

FIG. 5 is a schematic view illustrating partial allocation to a file; and

FIG. 6 shows the cylinder control block entries for the file having pages allocated as shown in FIG. 5.

DESCRIPTION OF THE PREFERRED EMBODIMENTS

FIG. 1 is a block diagram of a particular computer system on which the present invention may be implemented. Broadly, the computer system comprises a central processing unit (CPU) 10a, a service processor (SVP) 10b, a memory controller (MC) 10c and an I/O channel processor (IOCP) 10d, all of which communicate on a system bus 20 with bus arbitration being carried out by a bus control unit (BCU) 22. CPU 10a includes a cache/TLB (translation lookaside buffer) 11a and an arithmetic logical unit (ALU) 12a, and further communicates with a floating point accelerator (FPA) 13a. Service processor 10b is used for initialization and reconfiguration of the computer system. Memory controller 10c communicates with memory units 11c and 12c. I/O channel processor 10d includes a cache/TLB 11b, an ALU 12b, and a channel interface 13d. Channel interface 13d communicates via a separate bus 14d with a plurality of peripheral units which may include a tape controller 15d, an asynchronous multiplexer 16d and a disk controller 17d. Disk controller 17d communicates with a disk drive 18d (sometimes referred to simply as "disk" 18d).

The present invention relates to the manner in which file data and free space on disk 18d are organized. It is to be understood that the illustrative system configuration is for a small system and a more elaborate system would contain multiple CPUs, memory controllers, I/O channel processors, disk controllers, and disk drives. Moreover, while the discussion that follows refers to various numerical ranges and capacities, the particular numerical parameters are disclosed for illustrative purposes only, and the present invention does not depend on such implementation details. Capacities will be described in terms of Kilobytes, Megabytes, and Gigabytes where:

1 Kilobyte = $2^{10}$ or 1024 bytes

1 Megabyte = $2^{20}$ or 1,048,576 bytes

1 Gigabyte = $2^{30}$ or 1,073,741,824 bytes.

Generally, data, whether on disk or in memory is organized by pages, where a page includes 2 Kilobytes or 256 8-byte words.

FIG. 2A is a schematic view of disk drive 18d. Broadly, disk drive 18d includes a plurality of magnetic disks 30a–e arranged for co-rotation about a common axis. Each disk has at least one of its surfaces 31 coated with a magnetic recording medium. Associated with disks 30a–e are respective recording heads 32a–e mounted to respective arms 35a–e. Arms 35a–e are mounted to a common structure 37 which is capable of imparting common radial motion to all of the heads.

FIG. 2B shows a typical arrangement of data on one of disk surfaces 31. The surface is divided radially into a plurality of circumferentially extending tracks 40 at predetermined radial separation. The disk is provided with at least one timing track 42, typically engraved during manufacture of the disk, to provide clock pulses used for synchronizing all read and write operations. An index gap 45 is provided to reset the timing circuitry once every revolution. The collection of corresponding tracks 40 for all of disks 30a–e defines a physical cylinder.

FIG. 2C shows a typical arrangement of data within one of tracks 40. In the illustrative embodiment, the track is broken up into pages 47 with inter-record gaps 50 therebetween. Each page includes an identifier block 52 and a data block 55. Identifier block 52 includes: a hardware ID containing the cylinder, head, and sector numbers; and a software ID containing such information as the file number and logical page number within the file when the page is allocated to a file.

The hardware ID exists simply as a double check for the controller to see if a seek was performed correctly. The controller hardware compares the hardware ID with what it expected before performing any operations on the data. This protects data from being overwritten accidentally when the hardware is failing.

The software ID performs an analogous function, except that it is set under software command rather than being set at the time the disk is formatted. When the disk page is allocated a command is sent to the disk controller which results in the disk page being zeroed and the software ID being set. When the memory manager sends a read or write request to the disk controller, it includes the expected software ID in the message. The controller hardware compares the software ID supplied in the message to the one software ID in the identifier block, and rejects the requested operation if they do not match. This double check of the integrity of the operating system's tables protects the user's data from any of a number of possible sources of damage. The software ID performs a second useful function in that if the data structure mapping pages into files ever gets damaged, it can be reconstructed by simply reading the software IDs for all the pages on disk.

As will be seen more fully below, free space and files are organized on a logical cylinder basis. A logical cylinder is a subdivision of a physical cylinder and in the illustrative embodiment contains no more than 256 pages. A typical 300-Megabyte drive is characterized by physical cylinders of 171 pages; a 675-Megabyte drive by physical cylinders of 360 pages.

The pages that make up the logical cylinder are contiguous pages. One of the pages (typically physical page (O)) within each logical cylinder is used as a cylinder control block (hereinafter "CCB"). Each of the pages in the logical cylinder corresponds uniquely to one of the words in the CCB data block. The present invention relates to the manner in which the CCB entries map their corresponding disk pages onto files or free space. Broadly, a page may be in one of two states. Either the page is allocated to a file, or it is unallocated (that is, free). The CCB entry is formatted differently, depending on whether the corresponding page is allocated to a file or not.

As will appear more fully below, keeping the free space map and relevant portions of the file maps on the same cylinder as the pages of interest avoids the need for arm movement when the page is allocated and the map updated. Also, since the free space map is in the same page as the file map so that they are read and written substantially simultaneously, the possibilities for inconsistencies to creep into the data structures when crashes and other interruptions occur are drastically reduced.

Prior to discussing the data structures in detail, the overall data flow will be discussed briefly. The relationship of disk files to disk space is managed by a process called the disk domain manager (sometimes referred to as the DDM). On behalf of the memory manager, the DDM translates logical file addresses (logical position in file) into logical disk addresses (a logical disk address includes the logical pack number, the logical cylinder number, and the page number). The DDM also translates logical disk addresses into physical disk addresses (a physical disk address includes the controller number, the logical pack number within the controller, and the page number within the logical pack). The logical file address will sometimes be referred to simply as the "logical address." On behalf of users, it allocates and deallocates the disk pages which make up the files. The DDM performs an intermediary function in the mapping of files into and out of the address space of the requesting processes and performs a number of housekeeping functions such as disk compaction, initialization, and statistics gathering. The DDM manages a small number of relatively simple data structures including the cylinder control blocks, the logical domain label, and the disk domain block.

The most important of these is the cylinder control block ("CCB") which occupies exactly one page per logical cylinder and contains allocation and file page map information for that cylinder. The CCB is one of the two critical structures which must be protected from damage through operating system crashes. The CCB will be discussed in detail below.

The logical domain lable ("LDL") is the other data structure that must be crash-resistant. The LDL contains rather static information used when the DDM is started up. It includes a description of the logical packs in the disk domain. An important function is to provide the DDM information upon startup as to whether the disk domain was shut down gracefully the last time it was mounted. If not, the DDM must reconstruct the disk domain block before the disk domain can be used.

The disk domain block ("DDB") is used by the DDM in the allocation of disk pages to files. The DDB includes a count of the free pages available in each cylinder, a pointer to the first free page in each cylinder, and the logical address of each cylinder. The facts gleaned from the DDB are checked when the CCB indicated is read, so that the DDB provides, in essence, a collection of hints which may or may not be completely accurate. The DDB is maintained in a highly condensed form since it typically is resident in main memory. The DDB is not written back to the disk each time it is updated but only at such time as the disk domain is closed. Should the system go down, the DDB must be reconstructed from the CCBs, but this only requires a few seconds per disk pack. The copy of the DDB on disk will indicate if it was rewritten to the disk in a clean state.

The CCB data structure will now be described. A Pascal definition of the CCB is set forth in Appendix 1 wherein it may be seen that the CCB entry is arranged differently depending on whether or not the corresponding page is allocated. However, it is convenient for purposes of explanation to consider the CCB entry as having three pieces of information of maximum interest, namely a flag indicating whether or not the page is allocated and two pointers.

In the event that a page is unallocated, there is really no need for the pointers, since free space may readily be ascertained by checking the allocation flags. If desired, however, the free pages may be chained together by placing the page number of the next free page in one of the pointer fields. A backward pointer could also be used. The advantage of a linked free space list is that it allows the use of several different sorting algorithms which make finding the next page to allocate somewhat easier. The disadvantage is that additional overhead is expended in maintaining that linked list. Also, linked lists are notoriously error prone. The alternative, namely just marking the free pages' CCB flags, has simplicity, reduced maintenance overhead, and slightly improved crash resistance.

The discussion that follows relates to the manner in which pages that are allocated to a file are organized, that is, the nature of the CCB entries for pages that are allocated to a file. Generally, a file contains one or many 2-Kilobyte disk pages, and the disk domain manager has as its central function keeping a page map for each such file in the disk domain. Unlike the situation with the free space map in which the relative position of a free page within the free page list has no fundamental significance, the logical position of a page within a file is significant. In the discussion that follows, a page within a file will often be referred to by its logical address, that is its position in the file. It is the function of the file map to allow the determination of the physical disk addresses corresponding to particular logical addresses.

FIG. 3 is a schematic view showing the unbalanced binary tree structure of a file map. Each node is denoted by a square with the logical file address of the corresponding page inside. Each node for a page that is allocated to the file contains pointers (physical disk addresses) to up to two other pages in the file. A given node will sometimes be referred to as a "parent" with respect to the pages it points to, which will be referred to as the "children." Which logical file addresses a given node's pointers are directed to depends on the logical file address of the particular node, as will now be described. Since the position of the node in the CCB corresponds directly to the position of the page within the cylinder, there is no need for a separate pointer to the page corresponding to that node.

The file descriptor that is maintained by the DDM includes a pointer to logical page(0). In fact, the file descriptor is itself part of a file which is correspondingly configured. The pointers in node(0) are directed to logical pages(1, 2); those in node(2) to logical pages(3, 6); those in node(3) to logical pages(4, 5); and so on, as can be seen from the figure. That is, the file pointer is the physical disk address of logical page(0).

The CCB entry for logical page(0) has the physical disk addresses of logical pages(1, 2), which may be on the same cylinder or on different cylinders.

The file map is in the form of an unbalanced binary tree consisting of a sequence of balanced binary trees of increasing size. Root node(0) is the base of the first sub-tree which also includes node(1); node(2) is the base of the sub-tree which also includes nodes(3–5); node(6) is the base of the sub-tree which also includes nodes (7–13); and so on. Thus, should it be desired to access logical page(20), access is had via nodes (0, 2, 6, 14, 15, 16). Node(16) will have the physical disk address of logical page(20). A particular system for determining the pointer (physical address) for a given logical address is shown in Pascal notation in Appendix 2.

FIG. 4 shows the actual CCB entries for an illustrative file having logical pages (0–11) allocated thereto. The corresponding physical disk addresses are shown in tabular form in the figure. For illustrative purposes it is assumed that the allocated pages are all located on two cylinders, designated 1 and 2. A physical disk address is designated in simplified form (actually somewhat like a logical disk address), namely by cylinder and page as a two-integer sequence. Only the CCB entries for the allocated pages are shown. The fact that the corresponding pages are allocated, is symbolized by having the allocation field marked with a "X." It is noted that certain nodes, namely nodes(1, 4, 5, 9, 10, 12, etc.) do not contain pointers. These are so-called "leaf" nodes; the pointer fields for these noses are marked with a "—". Nodes that point to higher numbered pages that have not been allocated to this file, that is, node(6) which would point to logical page(14), node(11) which would point to logical pages(12, 13) are signified by marking the corresponding pointer fields "unallocated."

FIG. 5 is a schematic showing the file map where only some of the pages are allocated to the file. For definiteness it will be assumed that the process accessing the file only needs to access logical pages(1, 6, 7, 13, 14, 31). The nodes for these pages are shown as doubly outlined squares. Perusal of the tree structure indicates that additional pages will have to be allocated in order to provide nodes to complete the pathways. More particularly, node(0) is required to provide a pathway to any of the logical pages, node(2) is needed to complete the pathway to logical page(6), node(11) is needed to complete the pathway to logical page(13), and node(30) is needed to complete the pathway to logical page (31). The nodes for the additional pages that must be allocated to complete the pathways are shown as solid outlined squares. The remaining nodes (for unallocated pages) are shown as phantom outlined squares.

FIG. 6 shows the CCB entries for the allocated pages with the same convention and nomenclature as used in FIG. 4 above.

In view of the above description of the data structures used for mapping physical disk addresses onto logical stresses, the creation of the data structures will now be described.

The allocation of a page to a file can happen either at the time of creation of the file, or dynamically as the file space is needed. When a file is created, enough pages are allocated to satisfy an initial size parameter. As a file is used, a reference to a logical file address beyond such initial size causes a page fault to occur. The memory manager at that point sends a request to the DDM to allocate the page. Such a message would contain the file ID, the page number in the file (logical address), and possibly a memory manager message ID. The DDM then selects the page to be allocated to the file. The file map is updated and the memory manager is requested to write the modified CCB(s) and initialize the allocated page on disk (including setting the software ID in the identifier block). Finally, the memory manager is formally notified of the page which has been allocated to satisfy this request, completing the allocation of a page to a file.

The selection of a page to be allocated occurs in such a manner as to keep the pages of a file contiguous, or at least close to one another, in order to take advantage of read ahead strategies and to minimize arm movement. The first choice for the location of a new page is the page immediately following the previous page in the file, on the same cylinder and track as that previous page. If the previous page is the last page of a track, the first page of the next track is the preferred one. This presumably eliminates rotational delay when read ahead is in effect.

If the first choice page is not available, the second choice would be any other page on the same cylinder, in order to avoid arm movement. If the previous page was the last page on the last track of the cylinder, the first choice is any other page in the current cylinder. When all pages in the cylinder have been allocated, the DDM looks for free pages on a nearby cylinder, again with the purpose and effect of minimizing arm movement. When none of the above can be met, any free page from a good cylinder in the domain is selected according to any desired selection criteria.

Once an appropriate page has been selected, the following four operations must be performed to complete the allocation process:

(1) The page is initialized to a predetermined known state (typically all 0's) and the software ID set in the identifier block.

(2) The page is linked into the file page map.

(3) The data structures on disk are updated in a manner that cannot leave a file in an irrecoverable state.

(4) The memory manager is notified of the completion of the allocation.

These four operations are organized so that in most cases they may be executed in a single request to the disk controller. However, to do this, the steps are performed in a somewhat entangled manner. To simplify the explanation, the steps will be described separately, after which the mechanism which implements these steps will be described.

Initialization of a page occurs by the DDM issuing an explicit command to the memory manner to have the disk controller set the software ID and at the same time initialize the disk page to all 0's. As noted above, the use of the software ID is dictated by fault tolerance considerations.

The insertion of a page into the unbalanced binary tree file map requires the insertion of the physical page address into the appropriate pointer field within the parent node and the initialization of the child node to be a leaf node (as symbolized in FIGS. 4 and 6 by a "—").

In order to completely update the data structures, three data items, potentially on three different disk pages must be written before the new page is officially part of the file. These data items are the software ID on the allocated page, the CCB-based node pointers of the newly allocated pages, and the parent node's CCB-based pointer to the allocated page. The software ID must be written first, since if the system crashes either before or after, both the CCBs and the file page map will show the page available. The effect would be as if the page were never written. The CCB page with the child node must be written next. If a crash occurs after this write but before the parent node is written, the worst that can happen is that the page will be lost from sight. That is, the CCB entry will show the page as allocated but the parent node will show the file page as unallocated. Accordingly, a reference to that logical page in the file will cause a new one to be allocated, and the first allocated page will become lost. However, the file will still be intact, and lost space can be collected by any appropriate mechanism. The final write must be of the page (CCB) containing the parent node. Once this page is written, the file map will be complete and the disk page will have been initialized.

A simplifying fact is that the selection strategies tend to ensure that the parent node is in the same CCB as the child node, so that there is no danger of lost disk pages (disk writes may be assumed to be atomic). The only real problem in making the data structure crash resistant is in sequencing the writes. Since the parent node may be on a different logical cylinder, on a different disk controller, or on a different channel, the sequencing of the write of the parent CCB after the child CCB must be under the control of software, not hardware. Since the child CCB is guaranteed to be on the same physical device as the corresponding page, that part of the sequencing may be under either software or hardware control.

The reply to the memory manager must include the same sort of prototype page map entry as the memory manager receives for other map requests.

Now consider the actual mechanism for page allocation. Once a page has been selected, the CCBs for the parent node and the child node are in memory, as they were needed to make and validate the selection. The two possibilities are that the parent node and child node occur on the same page (same CCB) or that they occur in different pages (different CCBs). The latter case will be discussed first.

If the parent node and child node occur in different CCBs, it is guaranteed that they cannot be written in a single write. They could be on different physical disk packs on different I/O channels. In order to synchronize the write so that the parent node is never written before the child node or the data page, a three-step mechanism is employed. First, the CCB for the child node is updated in memory and an initialize page request is sent to the disk controller via the memory manager. This request includes the logical (file) address of the disk page to be initialized, the software ID to be placed in the identifier block, and the address of the CCB in the DDM's space. The memory manager freezes the CCB page and forwards the request to the appropriate disk controller. When the disk controller completes the operation, it notifies the memory manager which in turn notifies the DDM. At this point, the page is initialized and the child's CCB is on disk. The worst that could happen if a crash were to occur at this point is that the page would be lost from sight, since the file page map will still show that the page was never allocated. Second, the DDM updates in memory the CCB for the parent and forces it to disk. Once that atomic operation is complete, the file map will show the page as part of the file, a state which is insensitive to crashes. Finally, the DDM constructs the structure required by the memory manager and replies to the memory manager that the allocation is complete.

If the parent node and child node are in the same CCB, it is guaranteed that they can be written in one write, and that they are on the same logical cylinder as the data page that is being allocated. In general, they will be on the same physical cylinder, guaranteeing that there not be any arm movement in the writing of the two pages. As a consequence of the page selection strategies used, this will be the common case when allocating a single page. In this case, in order to effect an optimization, the DDM sets up the data structure as required by the memory manager, updates the CCB in memory, and replies to the memory manager with an initialize page request implied. The memory manager forwards the initialize page request to the controller, and it completes its internal processing of the allocated page reply. In essence, this incorporates into a single reply to the memory manager all the operations of the more complex case above.

As a side benefit of this strategy, the memory manager may proceed as if the page had been initialized on disk, even before it is actually written, since there are no synchronization problems. The reply to the memory manager will include the following parameters:

(a) prototype page map entry;
(b) prototype OFXT;
(c) message ID supplied by the memory manager;
(d) success/failure code;
(e) software ID to be put on the newly allocated page;
(f) DDM's address for the CCB; and
(g) logical disk address of the newly allocated page.

In summary it can be seen that the present invention significantly reduces arm movement and shortens search paths, thereby improving the speed at which files may be accessed and managed. While the above provides a full and complete disclosure of the preferred embodiments of the invention, various modifications, alternate constructions, and equivalents may be employed without departing from the true spirit and scope of the invention. For example, while the file map structure is based on an unbalanced binary tree, the invention could be implemented as an unbalanced n-way tree. Therefore the above description and illustrations should not be construed as limiting the scope of the invention which is defined by the appended claims.

| Appendix 1-Cylinder Control Block Format | |
|---|---|
| const | |
| CCBmaxIndex = | 33720; |
| CCBfileID = | 1; |
| type | |
| logDiskPackType = | 0..255; |
| CCBnumType = | 0..4095; |
| CCBpageNumType = | 0..225; |
| CCBvectorType = | |
| machine | |
| record | |
| LPnum : | logDiskPackType at 0 use 8; |
| CCBnum : | CCBnumType at 8 use 12; |
| PageNum : | CCBpageNumType at 20 use 8; |
| end; | |
| pagePointerType = | |
| record | |
| NILflag : | boolean; {is this pointer valid} |
| localFlag : | boolean; {within current CCB} |
| pageAddress : | CCBvectorType |
| | {full address of page} |
| end; | |
| pagePointerPairType = | |

| Appendix 1-Cylinder Control Block Format | |
|---|---|
| record | |
| case allocated : | boolean of |
| true: | |
| (case CCBpage : | boolean of |
| true: | |
| (currentLPaddress : | pageInDiskType; |
| NILflag : | boolean; |
| | {is next CCB valid} |
| nextCCBaddress : | CCBaddressType; |
| CCBchangeState : | DDMfileActionType; |
| | {intention file} |
| treeBase : | CCBpagNumType}; |
| | {intention file} |
| false: | |
| (leftPagePointer : | pagePointerType; |
| | {left child} |
| rightPagePointer : | pagePointerType);); |
| | {right child} |
| false: ( ); | {free page} |
| end; | |
| CCBtype = | array {0..225} of |
| | pagePointerPairType; |
| CCBfileType = | array {1..CCBmaxIndex} |
| | of CCBtype; |

Appendix 2-Determining File Page Address Relative to Root Node

```
subTreeRoot := 0;
fatherNode := 0;
found := false;
if pageInFile < > 0 then
begin
while (subTreeRoot < pageInFile) and
(NOT found) do
begin
nextRoot := subTreeRoot + subTreeRoot + 2;
if nextRoot > = pageInFile then
begin
found := true;
return address of left child
end
else
move to the right of current node
end;
fatherNode := subTreeRoot;
if pageInFile < >(subTreeRoot + subTreeRoot +2) then
begin { page is in sub tree }
subTreeSize := subTreeRoot / 2;
fatherNode := fatherNode + 1;
move to the left of current node
while NOT found do
begin
if pageInFile = fatherNode + 1 then
begin
found := true;
return address of left child
end
else
if pageInFile = (fatherNode + subtreeSize +1 )
then
begin
found := true;
return address of right child
end
else {not left or right son node,
get next subtree }
if pageInFile < = fatherNode + subTreeSize
then
begin { move to left to next subtree }
move to the left of current node
fatherNode := fatherNode +1;
subTreeSize := subTreeSize / 2;
end
else {move to right to next subtree }
begin
move to the right of current node
fatherNode := fatherNode +
```

Appendix 2-Determining File Page Address Relative to Root Node

```
subTreeSize + 1;
subTreeSize:= subTreeSize / 2;
end;
end; { of while NOT found }
end { of page is in subtree}
else {pageInFile = subTreeRoot + subTreeRoot + 2}
return address of right child
end { of not first page in the file }
else
return address of page 0
```

We claim:

1. A data processing system having a disk subsystem that includes at least one disk drive for mass storage wherein:

the disk subsystem defines a disk space that consists of a plurality of cylinders, each of which includes a plurality of disk pages;

each of said cylinders has an associated cylinder control block;

each disk page in said disk space is characterized by a physical disk address corresponding to the location of that page in said disk space;

information stored in said disk space is organized on the basis of at least one file;

a given file has M pages allocated thereto;

each of said M pages is characterized by a logical address corresponding to the logical position of that page in said given file;

said M pages are logically contiguous within said given file, having logical addresses 0 through $(M-1)$;

said given file has an associated file map that includes M file map entries corresponding to said M pages on a one-to-one basis;

for each of said M pages, the corresponding file map entry is located in whichever cylinder control block is associated with the cylinder in which that page is located;

for each of said M pages, the corresponding file map entry contains two pointer fields, each sized to specify a pointer representative of the physical address of a page in said disk space, thereby defining a set of 2M pointer fields;

of said M pages, for each page having a logical address greater than 0, a pointer representative of the physical address of that page is contained in one of the pointer fields of the file map entry corresponding to another of said M pages having a lower logical address, whereupon said 2M pointer fields collectively contain a set of $(M-1)$ pointers; and the locations of said $(M-1)$ pointers within said 2M pointer fields define an unbalanced binary tree structure wherein said file map consists of L sub-trees where L is the integer portion of $\log_2(M+1)$, each of said L sub-trees is uniquely characterized by an integer index in the range of 1 to L inclusive, for each value of an integer i in the range of 1 to $(L-1)$ inclusive, the sub-tree characterized by an index equal to i has $2^i$ file map entries corresponding to a subset of $2^i$ logically contiguous pages having logical addresses between $(2^i-2)$ and $(2^{i+1}-3)$ inclusive, and the sub-tree characterized by an index equal to L has $(M-2^L+2)$ file map entries corresponding to a subset of $(M-2^L+2)$ logically contiguous pages having logical addresses between $(2^L-2)$ and $(M-1)$ inclusive.

2. In a data processing system having a disk subsystem that includes at least one disk drive, wherein the disk subsystem defines a disk space that consists of a plurality of cylinders, the $j^{th}$ cylinder of which includes a plurality of $N_j$ disk pages, the improvement wherein:
  each of the cylinders includes a cylinder control block, the cylinder control block for the $j^{th}$ cylinder having space for a plurality of $N_j$ CCB entries corresponding on a one-to-one basis to the plurality of $N_j$ pages within the $j^{th}$ cylinder;
  information stored in said disk space is organized on the basis of a number of files, said number being at least one;
  a given file of said number of files has a plurality of M pages allocated thereto, with each of said M pages being characterized by a logical address corresponding to the logical position of that page in said given file;
  said plurality of M pages defines a corresponding plurality of M CCB entries;
  said plurality of M CCB entries defines a file map;
  said plurality of M CCB entries collectively contains a plurality of $(M-1)$ pointers with a maximum of n pointers in any one CCB entry where n is an integer greater than 1;
  of said M pages, for each page having a logical address greater than 0, a corresponding one of said $(M-1)$ pointers is representative of that page's physical address;
  each of said $(M-1)$ pointers is representative of the physical address of a page having a greater logical address than the logical address of the page corresponding to the CCB entry containing that pointer; and
  the relationship of said pointers to the logical addresses of said pages defines an unbalanced tree structure consisting of a sequence of balanced n-way sub-trees of increasing size.

3. The invention of claim 2 wherein each CCB entry includes a flag indicating whether or not the page corresponding to that CCB entry is allocated to one of said number of files.

4. The invention of claim 2 wherein one of the cylinders has a plurality of U pages, none of which pages is allocated to any of said number of files, whereupon said U pages are free pages;
  said plurality of U free pages defines a corresponding plurality of U CCB entries; and
  each of said U CCB entries contains a pointer representative of at least one other of said U CCB entries to define a chained list of free pages.

5. The invention of claim 2 wherein each cylinder and its corresponding cylinder control block are characterized in that the CCB entries within that cylinder control block are in the same order as the pages within that cylinder, so that the relative position of any particular CCB entry within that cylinder control block uniquely determines the disk page corresponding to that particular CCB entry.

6. The invention of claim 2 wherein said M pages are logically contiguous pages having logical addresses from 0 through $(M-1)$.

7. In a data processing system having a disk subsystem that includes at least one disk drive, wherein the disk subsystem defines a disk space that consists of a plurality of cylinders, the $j^{th}$ cylinder of which includes a plurality of $N_j$ disk pages, the improvement wherein:
  each of the cylinders includes a cylinder control block, the cylinder control block for the $j^{th}$ cylinder having space for a plurality of $N_j$ CCB entries corresponding on a one-to-one basis to the plurality of $N_j$ pages within the $j^{th}$ cylinder;
  information stored in said disk space is organized on the basis of a number of files, said number being at least one;
  a given file of said number of files has a plurality of M pages allocated thereto, with each of said M pages being characterized by a logical address corresponding to the logical position of that page in said given file;
  said plurality of M pages defines a corresponding plurality of M CCB entries;
  said plurality of M CCB entries defines a file map;
  said plurality of M CCB entries collectively contains a plurality of $(M-1)$ pointers with a maximum of two pointers in any one CCB entry;
  of said M pages, for each page having a logical address greater than 0, a corresponding one of said $(M-1)$ pointers is representative of that page's physical address;
  each of said (M-1) pointers is representative of the physical address of a page having a greater logical address than the logical address of the page corresponding to the CCB entry containing that pointer; and
  the relationship of said pointers to the logical addresses of said pages defines an unbalanced binary tree structure consisting of a sequence of balanced binary sub-trees of increasing size.

8. The invention of claim 7 wherein each CCB entry includes a flag indicating whether or not the page corresponding to that CCB entry is allocated to one of said number of files.

9. The invention of claim 7 wherein one of the cylinders has a plurality of U pages, none of which pages is allocated to any of said number of files, whereupon said U pages are free pages;
  said plurality of U free pages defines a corresponding plurality of U CCB entries; and
  each of said U CCB entries contains a pointer representative of at least one other of said U CCB entries to define a chained list of free pages.

10. The invention of claim 7 wherein each cylinder and its corresponding cylinder control block are characterized in that the CCB entries within that cylinder control block are in the same order as the pages within that cylinder, so that the relative position of any particular CCB entry within that cylinder control block uniquely determines the disk page corresponding to that particular CCB entry.

11. The invention of claim 7 wherein said M pages are logically contiguous pages having logical addresses from 0 through $(M-1)$.

* * * * *